(12) United States Patent
Zhao

(10) Patent No.: US 12,147,727 B2
(45) Date of Patent: Nov. 19, 2024

(54) METHOD AND APPARATUS FOR PROCESSING MULTIMEDIA DATA, AND STORAGE MEDIUM

(71) Applicant: Beijing Xiaomi Mobile Software Co., Ltd., Beijing (CN)

(72) Inventor: Linger Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/957,572

(22) Filed: Sep. 30, 2022

(65) Prior Publication Data

US 2023/0138241 A1 May 4, 2023

(30) Foreign Application Priority Data

Oct. 29, 2021 (CN) .......................... 202111275495.5

(51) Int. Cl.
*G06F 3/14* (2006.01)
*G06F 3/0481* (2022.01)

(52) U.S. Cl.
CPC .......... *G06F 3/1454* (2013.01); *G06F 3/0481* (2013.01)

(58) Field of Classification Search
CPC ........ G06F 3/14; G06F 3/0481; G06F 3/0488; G06F 3/1454; G06F 3/04883; G06F 3/04886; G06F 3/147; H04L 67/06; H04M 1/60; H04M 1/72403; H04M 1/72409; H04M 1/72457; H04M 1/72463
USPC ........................................................ 709/213
See application file for complete search history.

(56) References Cited

U.S. PATENT DOCUMENTS

| | | | | |
|---|---|---|---|---|
| 11,288,030 B2* | 3/2022 | Locker | ................ | G06F 3/0488 |
| 11,442,618 B2* | 9/2022 | Qian | ................ | G06F 3/04883 |
| 11,863,600 B2* | 1/2024 | Yang | ................ | H04L 65/4015 |
| 2010/0165965 A1* | 7/2010 | Carlton | ................ | H04W 76/14 |
| | | | | 370/338 |
| 2011/0065459 A1* | 3/2011 | Cheng | ................ | G06F 3/0488 |
| | | | | 455/457 |
| 2011/0106954 A1* | 5/2011 | Chatterjee | ............. | H04W 12/50 |
| | | | | 709/227 |
| 2014/0082519 A1* | 3/2014 | Wang | ................ | H04M 1/72403 |
| | | | | 715/748 |
| 2014/0281955 A1* | 9/2014 | Sprenger | ............ | H04L 12/1818 |
| | | | | 715/702 |

(Continued)

FOREIGN PATENT DOCUMENTS

| | | |
|---|---|---|
| CN | 102681958 A | 9/2012 |
| CN | 103874010 A | 6/2014 |

(Continued)

OTHER PUBLICATIONS

Extended European Search Report issued on Feb. 20, 2023 for European Patent Application No. 22199223.3.

*Primary Examiner* — James N Fiorillo
(74) *Attorney, Agent, or Firm* — Volpe Koenig

(57) ABSTRACT

A method and apparatus for processing multimedia data, and a storage medium. The method is performed by a sending end and includes: obtaining and displaying target multimedia data in response to a processing instruction; and sending the target multimedia data to a receiving end through a preset communication connection so as to make the receiving end display the target multimedia data synchronously in a specified region of a display interface of the receiving end.

17 Claims, 12 Drawing Sheets

(56) References Cited

U.S. PATENT DOCUMENTS

| | | | | |
|---|---|---|---|---|
| 2015/0042538 A1* | 2/2015 | Locker | ............... | G06F 3/1454 |
| | | | | 345/1.3 |
| 2018/0077547 A1* | 3/2018 | Sanchez Barajas | .. | H04W 4/023 |
| 2018/0349017 A1* | 12/2018 | Chen | ...................... | H04N 5/04 |
| 2020/0065052 A1* | 2/2020 | Lewbel | ................... | G09G 5/38 |
| 2021/0200861 A1* | 7/2021 | Wu | ...................... | A63F 13/92 |
| 2022/0004315 A1* | 1/2022 | Zhang | .............. | H04N 21/41407 |
| 2022/0147207 A1* | 5/2022 | Huang | ............. | H04M 1/72457 |
| 2022/0206735 A1* | 6/2022 | Zhao | ...................... | G09G 5/36 |
| 2022/0239985 A1* | 7/2022 | Kou | ..................... | G06F 3/0482 |
| 2023/0342106 A1* | 10/2023 | Ji | ......................... | G06F 9/451 |
| 2024/0134491 A1* | 4/2024 | Yang | ................. | G06F 3/04883 |
| 2024/0231556 A9* | 7/2024 | Yang | ................... | G06F 3/0481 |

FOREIGN PATENT DOCUMENTS

| | | | | |
|---|---|---|---|---|
| CN | 105191363 A | | 12/2015 | |
| CN | 106507286 A | | 3/2017 | |
| CN | 111651617 A | | 9/2020 | |
| WO | WO-2016004857 A1 * | | 1/2016 | ....... H04N 21/41407 |

\* cited by examiner

METHOD AND APPARATUS FOR PROCESSING MULTIMEDIA DATA, AND STORAGE MEDIUM

CROSS REFERENCE TO RELATED APPLICATIONS

The disclosure is provided based on and claims priority to the Chinese Patent Application No. 202111275459.5, filed on Oct. 29, 2021, the entire contents of which are incorporated herein by reference.

BACKGROUND

In the related art, with rapid development of an Internet technology, there are more and more types of smart devices that a user can select, and interaction between smart terminals is more and more common.

SUMMARY

The disclosure provides a method and apparatus for processing multimedia data, and a storage medium.

According to a first aspect of examples of the disclosure, a method for processing multimedia data is provided and performed by a sending end, and includes: obtaining and displaying target multimedia data in response to a processing instruction; and sending the target multimedia data to a receiving end through a preset communication connection so as to make the receiving end display the target multimedia data synchronously in a specified region of a display interface of the receiving end.

According to a second aspect of examples of the disclosure, a method for processing multimedia data is provided and performed by a receiving end, and includes: receiving target multimedia data sent by a sending end through a preset communication connection, in which the target multimedia data are obtained and displayed by the sending end in response to a processing instruction; and displaying the target multimedia data synchronously in a specified region of a display interface of the receiving end.

According to a third aspect of examples of the disclosure, an apparatus for processing multimedia data is provided and applied to a sending end, and includes: a processor; and a memory, configured to store an instruction capable of being executed by the processor. The processor is configured to: obtain and display target multimedia data in response to a processing instruction; and send the target multimedia data to a receiving end through a preset communication connection so as to make the receiving end display the target multimedia data synchronously in a specified region of a display interface of the receiving end.

According to a fourth aspect of examples of the disclosure, an apparatus for processing multimedia data is provided and applied to a receiving end, and includes: a processor; and a memory, configured to store an instruction capable of being executed by the processor. The processor is configured to: receive target multimedia data sent by a sending end through a preset communication connection, in which the target multimedia data are obtained and displayed by the sending end in response to a processing instruction; and display the target multimedia data synchronously in a specified region of a display interface of the receiving end.

According to a fifth aspect of examples of the disclosure, a computer-readable storage medium is provided and stores a computer program instruction, and the program instruction, when executed by a processor, implements steps of the method for processing the multimedia data provided by the first aspect of the disclosure.

According to a sixth aspect of examples of the disclosure, a computer-readable storage medium is provided and stores a computer program instruction, and the program instruction, when executed by a processor, implements steps of the method for processing the multimedia data provided by the second aspect of the disclosure.

It should be understood that the above general description and the following detailed description are merely illustrative and explanatory instead of limiting the disclosure.

BRIEF DESCRIPTION OF THE DRAWINGS

Accompanying drawings here, which are incorporated in and constitute a part of the specification, illustrate examples consistent with the disclosure and, together with the specification, serve to explain principles of the disclosure.

DETAILED DESCRIPTION

Examples will be described here in detail and shown in the accompanying drawings. Unless otherwise stated, when the following description refers to the accompanying drawings, the same number in the different accompanying drawings indicates the same element or similar elements. Implementations described in the following examples do not represent all implementations consistent with the disclosure. On the contrary, they are merely examples of an apparatus and method consistent with some aspects of the disclosure as detailed in appended claims.

The disclosure relates to the technical field of multimedia, in particular to a method and apparatus for processing multimedia data, and a storage medium.

In the related art, with rapid development of an Internet technology, there are more and more types of smart devices that a user can select, and interaction between smart terminals is more and more common. Normally, data transmission between the smart devices (such as a smartphone and a tablet computer) needs to pass through a multi-verification and complicated connection process, and data generated in a smart terminal cannot be instantaneously transmitted to another smart terminal, so data transmission efficiency and time-efficient performance are low.

Before introducing a method and apparatus for processing multimedia data and a storage medium provided by the disclosure, first of all, application scenarios involved in various examples of the disclosure are introduced. The application scenarios may include at least one sending end and at least one receiving end, information interaction may be performed between the sending end and the receiving end, and the sending end and the receiving end can be switched to each other. Both the sending end and the receiving end may be any type of smart device capable of sending, receiving and processing multimedia information, for example, a smartphone, a tablet computer, a smart television, a personal digital assistant (PDA), a projector, a portable computer and other mobile terminals, or may also be a fixed terminal such as a desktop computer.

Figure 1:
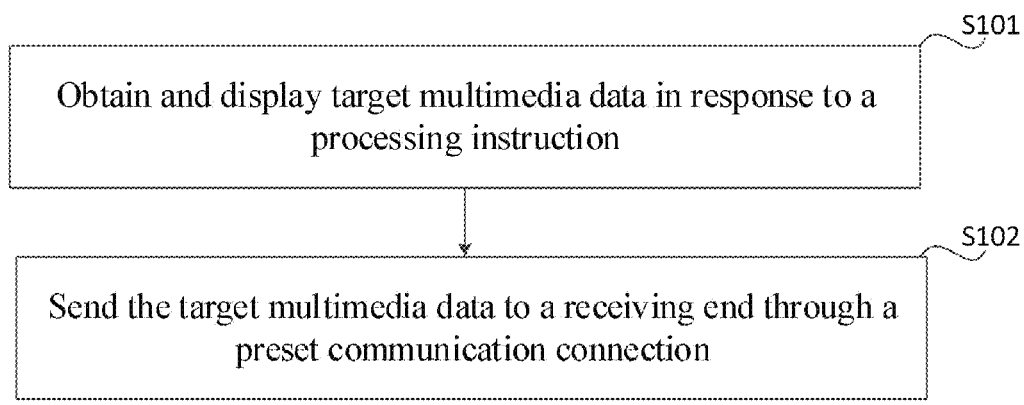
FIG. 1 is a flowchart of a method for processing multimedia data shown according to an example.

FIG. 1 is a flowchart of a method for processing multimedia data shown according to an example. As shown in FIG. 1, the method is performed by a sending end and includes the following steps.

In step S101, target multimedia data are obtained and displayed in response to a processing instruction.

For example, a user, when using the sending end, often browses photos, takes a picture, takes a screenshot, records a video and other operations, in the meantime, the user may also share multimedia data such as a picture, a video, a dynamic image generated by these operations to other terminals, namely, a receiving end. The user may perform a first specified operation on the sending end so as to trigger the processing instruction. The first specified operation may be an operation of taking a picture, an operation of taking a screenshot, a recording operation and the like, or may also be a selection operation implemented by gestures of clicking, swiping and the like in a preset multimedia library. The multimedia library may be a picture library, a video library and the like stored locally in the sending end, or may also be a picture library, a video library and the like obtained by the sending end through a network. The sending end, after receiving the processing instruction, can obtain the target multimedia data corresponding to the processing instruction and display the target multimedia data on a display interface of the sending end. The target multimedia data may be a photo shot by the operation of taking a picture, or may also be a picture generated by the operation of taking a screenshot, or may also be a video or a dynamic image recorded by the recording operation, or may also be a picture, a video or a dynamic image selected in the multimedia library by the selection operation, which is not specifically limited by the disclosure.

In step S102, the target multimedia data are sent to the receiving end through a preset communication connection so as to make the receiving end display the target multimedia data synchronously in a specified region of a display interface of the receiving end.

For example, the sending end, while displaying the target multimedia data on the display interface of the sending end, may send the obtained target multimedia data to the receiving end through the preset communication connection. Specifically, the sending end may directly send the target multimedia data to the receiving end when obtaining the target multimedia data, or may also further obtain a transmission instruction when obtaining the target multimedia data and send the target multimedia data to the receiving end according to the transmission instruction. The receiving end, after receiving the target multimedia data, may display the target multimedia data synchronously in the specified region of the display interface of the receiving end. The specified region may be, for example, an upper left angle, an upper right angle, a lower left angle, a lower right angle, a center region and the like of the display interface. Furthermore, the receiving end may also display the target multimedia data in the specified region according to a preset displaying mode. For example, the target multimedia data may be displayed in the specified region according to an air bubble displaying mode, or may also be displayed in the specified region according to a preset photo frame displaying mode, or may also be displayed in the specified region according to a preset filter or special effect displaying mode. In this way, through the preset communication connection between the sending end and the receiving end, transmission of the multimedia data can be performed fast and conveniently, and a data interaction efficiency is improved.

To sum up, in the disclosure, the sending end firstly obtains and displays the target multimedia data in response to the processing instruction and then sends the target multimedia data to the receiving end through the preset communication connection. The receiving end, after receiving the target multimedia data, displays the target multimedia data synchronously in the specified region of the display interface of the receiving end. In the disclosure, the multimedia data are sent to the receiving end through the preset communication connection such that the receiving end can display the target multimedia data synchronously, so the efficiency, the time-efficient performance and the convenience of transmission of the multimedia data are improved.

Figure 2:
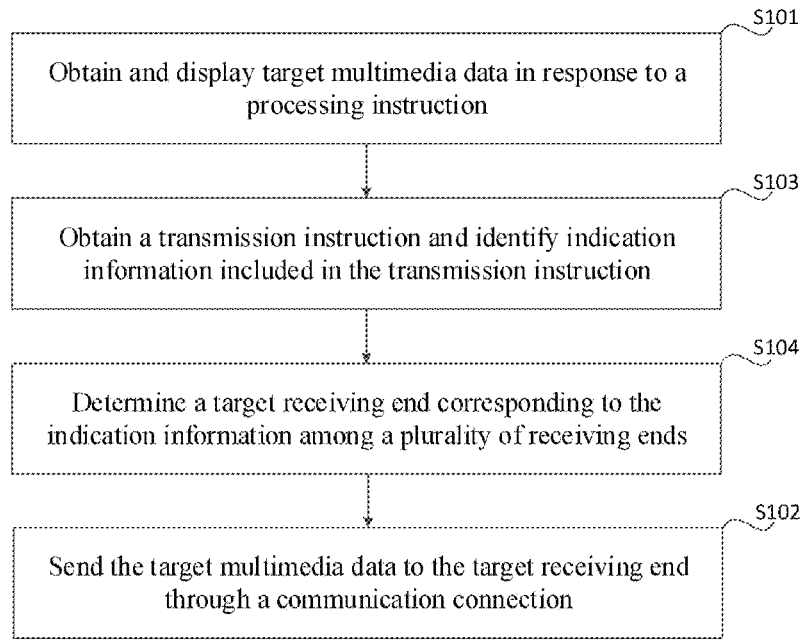
FIG. 2 is a flowchart of another method for processing multimedia data shown according to an example.

FIG. 2 is a flowchart of another method for processing multimedia data shown according to an example. As shown in FIG. 2, there are a plurality of receiving ends, and before step S102, the method includes step S101 and further includes the following steps.

In step S103, a transmission instruction is obtained, and indication information included in the transmission instruction is identified.

In step S104, a target receiving end corresponding to the indication information is determined among the plurality of receiving ends.

Correspondingly, an implementation of step S102 may be: the target multimedia data are sent to the target receiving end through the communication connection.

For example, there may be a plurality of receiving ends corresponding to the sending end, in other words, the sending end may establish the communication connection with the plurality of receiving ends at the same time. The sending end, after obtaining the target multimedia data, may further obtain the transmission instruction and parse the transmission instruction so as to obtain the indication information included in the transmission instruction. The transmission instruction may be triggered by the user when the first specified operation is performed, that is, the transmission instruction and the processing instruction may be triggered at the same time, or may be triggered when a second specified operation is performed after the user obtains the target multimedia data on the sending end. The second specified operation may be, for example, clicking, swiping or stretching the target multimedia data, and the indication information may be used to, for example, indicate a direction, or may also be used to indicate a terminal identifier, or may also be used to indicate a terminal type.

Furthermore, the sending end may determine the target receiving end corresponding to the indication information among the plurality of receiving ends according to the indication information and send the target multimedia data to the target receiving end through the communication connection. If the indication information can indicate the direction, a location where the target receiving end is located matches a direction indicated by the indication information. If the indication information can indicate the terminal identifier, a terminal identifier of the target receiving end matches the terminal identifier indicated by the indication information. If the indication information can indicate the terminal type, a type of the target receiving end matches the terminal type indicated by the indication information. Specifically, in response to determining that the second specified operation is swiping, the indication information may indicate a swiping direction, and the target receiving end is a receiving end matching the swiping direction. For example, when the user swipes the target multimedia data leftwards, the target receiving end may be a receiving end on left of the sending end. In response to determining that the second specified operation is to input a terminal identifier, the indication information may indicate the terminal identifier, and the target receiving end is a receiving end matching the terminal identifier. For example, when the user inputs a terminal identifier "123456", the target receiving end is a receiving end with the terminal identifier "123456". In response to determining that the second specified operation is to select the terminal type, the indication information may indicate the terminal type, and the target receiving end is a receiving end matching the terminal type. For example, in response to determining that the terminal type selected by the user is a tablet computer, the target receiving end is a receiving end with the terminal type of a tablet computer. In this way, through the communication connection between the sending end and the plurality of receiving ends, interaction of the multimedia data among the plurality of devices can be implemented faster and more conveniently, and the data interaction efficiency is improved.

Figure 3:
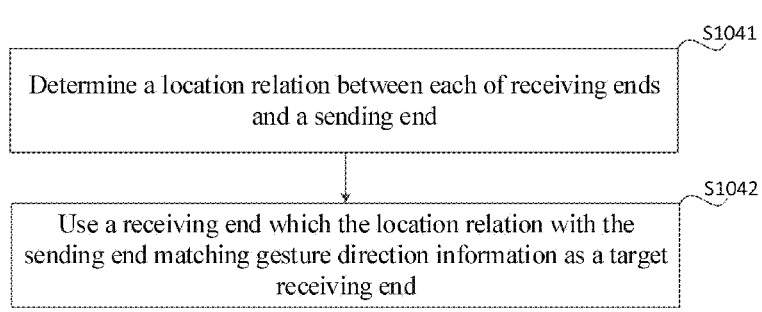
FIG. 3 is a flowchart of another method for processing multimedia data shown according to an example.

FIG. 3 is a flowchart of another method for processing multimedia data shown according to an example. As shown in FIG. 3, the indication information includes: gesture direction information. Step S104 may be implemented through the following steps.

In step S1041, a location relation between each of the receiving ends and the sending end is determined.

In step S1042, a receiving end which the location relation with the sending end matching the gesture direction information is used as the target receiving end.

For example, the indication information may be the gesture direction information, the gesture direction information may be the swiping direction on a screen by the user, or may also be a direction of a gesture executed on the screen by the user, which is not specifically limited by the disclosure. The sending end may firstly detect the location relation between each of the receiving ends and the sending end through a specified detection apparatus. The specified detection apparatus may be a radar, ultrasonic waves, an infrared detection apparatus, a signal intensity sensor and any other type of apparatus capable of identifying a direction of the receiving end. After that, the location relation with the sending end may be determined, and the receiving end matching the gesture direction information is used as the target receiving end. For example, there are three receiving ends, which are located in front, on left and on right of the sending end respectively, in response to determining that a direction indicated by the gesture direction information is left, it can be determined that the target receiving end is a receiving end located on left of the sending end, so that the target multimedia data are sent to the receiving end on left of the sending end.

Figure 4:
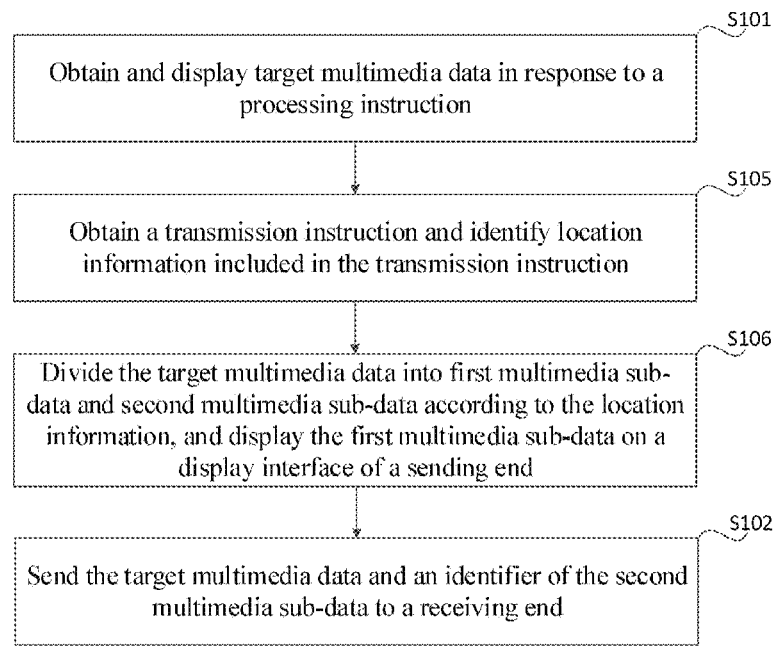
FIG. 4 is a flowchart of another method for processing multimedia data shown according to an example.

FIG. 4 is a flowchart of another method for processing multimedia data shown according to an example. As shown in FIG. 4, before step S102, the method includes step S101 and further includes the following steps.

In step S105, the transmission instruction is obtained, and the location information included in the transmission instruction is identified.

In step S106, the target multimedia data are divided into first multimedia sub-data and second multimedia sub-data according to the location information, and the first multimedia sub-data are displayed on the display interface of the sending end.

Correspondingly, an implementation of step S102 may be: the target multimedia data and the identifier of the second multimedia sub-data are sent to the receiving end so as to make the receiving end display the second multimedia sub-data in the specified region of the display interface of the receiving end, in which the identifier is configured to indicate a location of the second multimedia sub-data in the target multimedia data.

For example, the sending end, after obtaining the target multimedia data, may further obtain the transmission instruction and parse the transmission instruction so as to obtain the location information included in the transmission instruction. The transmission instruction may be, for example, triggered when the user performs the operations such as clicking or swiping the multimedia data, and the location information may be configured to indicate a location of the target multimedia data on a display interface. After that, the target multimedia data may be divided into the first multimedia sub-data and the second multimedia sub-data according to the location information, and the first multimedia sub-data are displayed on the display interface of the sending end. In response to determining that the target multimedia data are a picture, the first multimedia sub-data and the second multimedia sub-data may be regarded as two sub-pictures divided from the picture. In response to determining that the target multimedia data are a video, the first multimedia sub-data and the second multimedia sub-data may be regarded as two sub-videos divided from the video, and a video frame included in each sub-video is a part of a video frame included in the video. Furthermore, the target multimedia data and the identifier of the second multimedia sub-data may be sent to the receiving end, and the identifier of the second multimedia sub-data is configured to indicate the location of the second multimedia sub-data in the target multimedia data. The receiving end, after receiving the target multimedia data and the identifier, may extract the second multimedia sub-data from the target multimedia data according to the identifier, and display the second multimedia sub-data in the specified region of the display interface of the receiving end. In this way, with change of the location information, the sending end can update the first multimedia sub-data, the second multimedia sub-data and the identifier in real time, in the meantime, the receiving end can also update the second multimedia sub-data in real time, such that a dynamic and synchronous displaying effect can be achieved on the display interfaces of the sending end and the receiving end in a transmission process of the target multimedia data.

Figure 5:
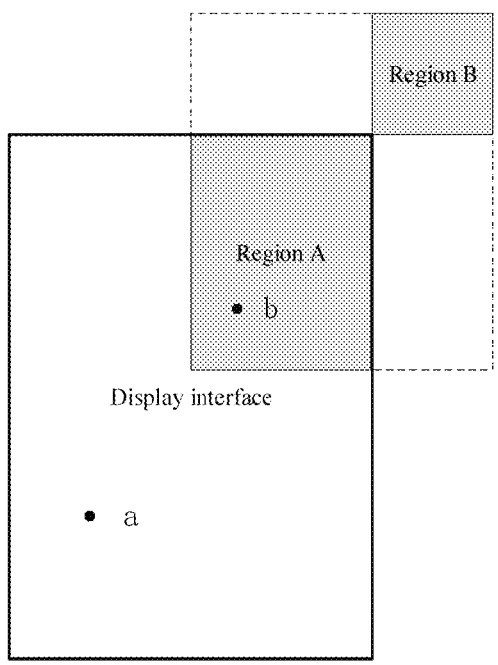
FIG. 5 is a schematic diagram of dividing target multimedia data shown according to an example of FIG. 4.

Specifically, taking the transmission instruction being triggered by swiping target multimedia displayed on the display interface of the sending end by the user with a finger as an example, the sending end may detect a location of the finger on the display interface, and divide the first multimedia sub-data and the second multimedia sub-data according to a displacement between a current location of the finger and an initial location of the finger when the finger starts swiping. As shown in FIG. 5, a point a is the initial location of the finger on the display interface, a point b is the current location of the finger on the display interface, the target multimedia data are a picture, according to a location relation between the point a and the point b, the picture may be divided into a Region A and a Region B, a sub-picture composed of pixels in the Region A is the first multimedia sub-data, and a sub-picture composed of pixels in the Region B is the second multimedia sub-data. In other words, the sub-picture corresponding to the Region A is displayed on the sending end, and the sub-picture corresponding to the Region B is displayed on the receiving end.

Figure 6:
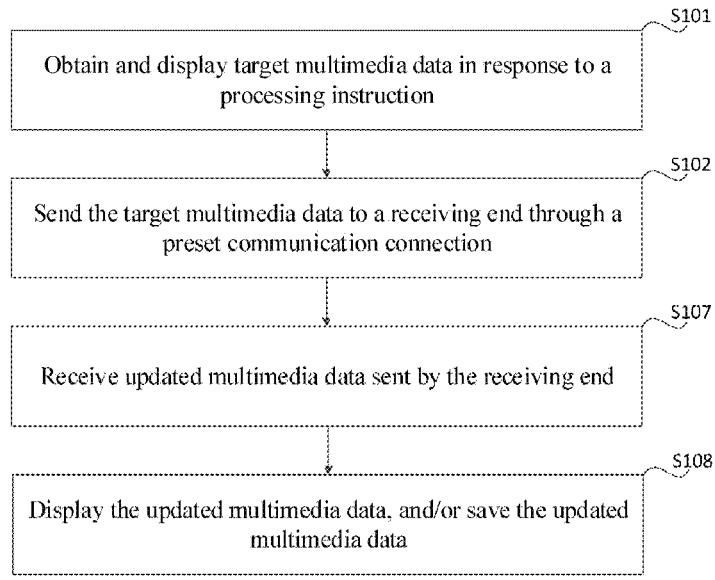
FIG. 6 is a flowchart of another method for processing multimedia data shown according to an example.

FIG. 6 is a flowchart of another method for processing multimedia data shown according to an example. As shown in FIG. 6, the method includes steps S101 and S102 and further includes the following steps.

In step S107, updated multimedia data sent by the receiving end are received, in which the updated multimedia data are generated after the receiving end performs specified processing on the target multimedia data.

In step S108, the updated multimedia data are displayed, and/or the updated multimedia data are saved.

For example, the receiving end, after receiving the target multimedia data, may perform specified processing, generate the updated multimedia data and then send the updated multimedia data to the sending end. The sending end may receive the updated multimedia data and display the updated multimedia data on the display interface of the sending end or may also save the updated multimedia data. The specified processing may be regarded as editing the target multimedia data, for example, may be adding a filter, a title, a special effect and other processing, or may also be cutting, compressing and other processing, which is not specifically limited by the disclosure.

Specifically, taking the sending end being a smartphone, the receiving end being a tablet computer, and the target multimedia data being a photo as an example, after the smartphone shoots a photo, if the user intends to edit the photo on the tablet computer, then the photo can be sent to the tablet computer, after the tablet computer receives the photo, the user may edit the photo on the tablet computer, and the edited photo is sent to the smartphone. The smartphone, after receiving the edited photo, may display the edited photo on the display interface or may also save the edited photo.

Figure 7:
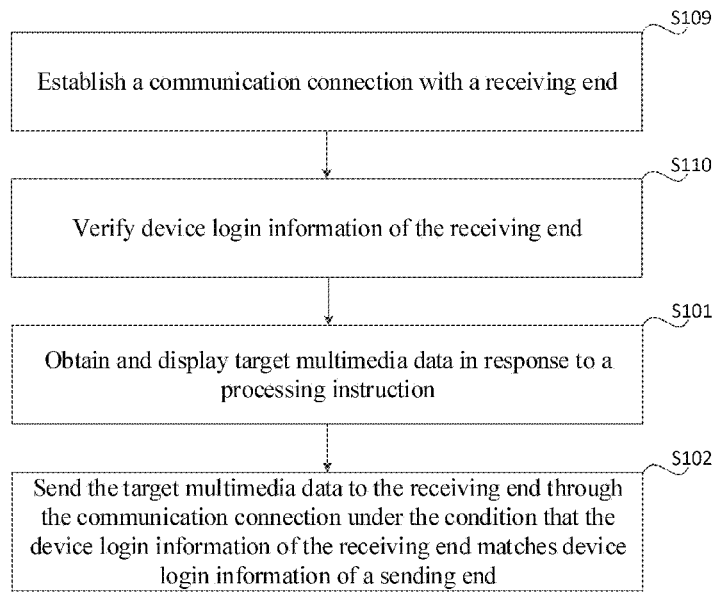
FIG. 7 is a flowchart of another method for processing multimedia data shown according to an example.

FIG. 7 is a flowchart of another method for processing multimedia data shown according to an example. As shown in FIG. 7, the method further includes the following steps.

In step S109, the communication connection with the receiving end is established.

In step S110, device login information of the receiving end is verified so as to determine whether the device login information of the receiving end matches device login information of the sending end.

Steps S109 and S110 are performed prior to steps S101 and S102. Correspondingly, an implementation of step S102 may be: the target multimedia data are sent to the receiving end through the communication connection under the condition that the device login information of the receiving end matches the device login information of the sending end.

For example, before information interaction is performed between the sending end and the receiving end, the sending end may firstly establish the communication connection with the receiving end through a preset communication protocol. The communication protocol may be wireless-Fidelity (Wi-Fi) protocol, a Bluetooth protocol and the like, a Zigbee protocol, 6LoWPAN protocol and the like, which is not specifically limited by the disclosure. After the sending end and the receiving end establish the communication connection, the sending end may receive the device login information of the receiving end, verify the device login information of the receiving end and judge whether the device login information of the receiving end matches the device login information of the sending end. The condition that the device login information of the receiving end matches the device login information of the sending end may be that the sending end and the receiving end log in the same user account, or may also be that the sending end and the receiving end belong to the same local area network, or may also be that there is a social relation (for example, being friends with each other) between a user account which the sending end logs in and a user account which the receiving end logs in, which is not specifically limited by the disclosure. Under the condition that the device login information of the receiving end matches the device login information of the sending end, the sending end may send the target multimedia data to the receiving end through the communication connection. In this way, the communication connection is established between the receiving end and the sending end in advance, transmission of the multimedia data can be performed fast and conveniently, and the data interaction efficiency is improved.

To sum up, in the disclosure, the sending end firstly obtains and displays the target multimedia data in response to the processing instruction and then sends the target multimedia data to the receiving end through the preset communication connection. The receiving end, after receiving the target multimedia data, displays the target multimedia data synchronously in the specified region of the display interface of the receiving end. In the disclosure, the multimedia data are sent to the receiving end through the preset communication connection such that the receiving end can display the target multimedia data synchronously, so the efficiency, the time-efficient performance and the convenience of transmission of the multimedia data are improved.

Figure 8:
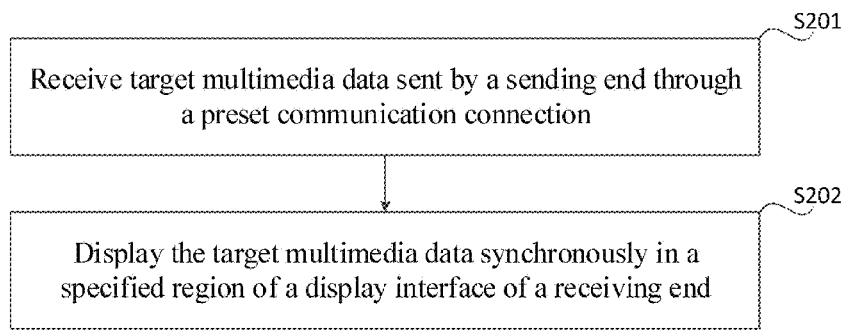
FIG. 8 is a flowchart of a method for processing multimedia data shown according to an example.

FIG. 8 is a flowchart of a method for processing multimedia data shown according to an example. As shown in FIG. 8, the method is performed by a receiving end and includes steps S201 and S202.

In step S201, target multimedia data sent by a sending end are received through a preset communication connection, in which the target multimedia data are obtained and displayed by the sending end in response to a processing instruction.

For example, a user, when using the sending end, often browses photos, takes a picture, takes a screenshot, records a video and other operations, in the meantime, the user may also share multimedia data such as a picture, a video, a dynamic image generated by these operations to other terminals, namely, the receiving end. First of all, the user may perform a first specified operation on the sending end so as to trigger the processing instruction. The first specified operation may be an operation of taking a picture, an operation of taking a screenshot, a recording operation and the like, or may also be a selection operation implemented by gestures of clicking, swiping and the like in a preset multimedia library. The multimedia library may be a picture library, a video library and the like stored locally in the sending end, or may also be a picture library, a video library and the like obtained by the sending end through a network. The sending end, after receiving the processing instruction, can obtain the target multimedia data corresponding to the processing instruction and display the target multimedia data on a display interface of the sending end. The target multimedia data may be a photo shot by the operation of taking a picture, a picture generated by the operation of taking a screenshot, a video or a dynamic image recorded by the recording operation, or may also be a picture, a video, or a dynamic image selected in the multimedia library by the selection operation, which is not specifically limited by the disclosure. In the meantime, the sending end may send the obtained target multimedia data to the receiving end through the preset communication connection. Specifically, the sending end may directly send the target multimedia data to the receiving end when obtaining the target multimedia data, or may also further obtain a transmission instruction when obtaining the target multimedia data and send the target multimedia data to the receiving end according to the transmission instruction.

In step S202, the target multimedia data are displayed synchronously in the specified region of the display interface of the receiving end.

Furthermore, the receiving end may receive the target multimedia data sent by the sending end through the communication connection, and display the target multimedia data synchronously in the specified region of the display interface of the receiving end. The specified region may be, for example, an upper left angle, an upper right angle, a lower left angle, a lower right angle, a center region and the like of the display interface. Furthermore, the receiving end may also display the target multimedia data in the specified region according to a preset displaying mode. For example, the target multimedia data may be displayed in the specified region according to an air bubble displaying mode, displayed in the specified region according to a preset photo frame displaying mode, or may also be displayed in the specified region according to a preset filter or special effect displaying mode. In this way, through the communication connection between the receiving end and the sending end, transmission of the multimedia data can be performed fast and conveniently, and data interaction efficiency is improved.

To sum up, in the disclosure, the sending end firstly obtains and displays the target multimedia data in response to the processing instruction and then sends the target multimedia data to the receiving end through the preset communication connection. The receiving end, after receiving the target multimedia data, displays the target multimedia data synchronously in the specified region of the display interface of the receiving end. In the disclosure, the multimedia data are sent to the receiving end through the preset communication connection such that the receiving end can display the target multimedia data synchronously, so an efficiency, time-efficient performance and convenience of transmission of the multimedia data are improved.

Figure 9:
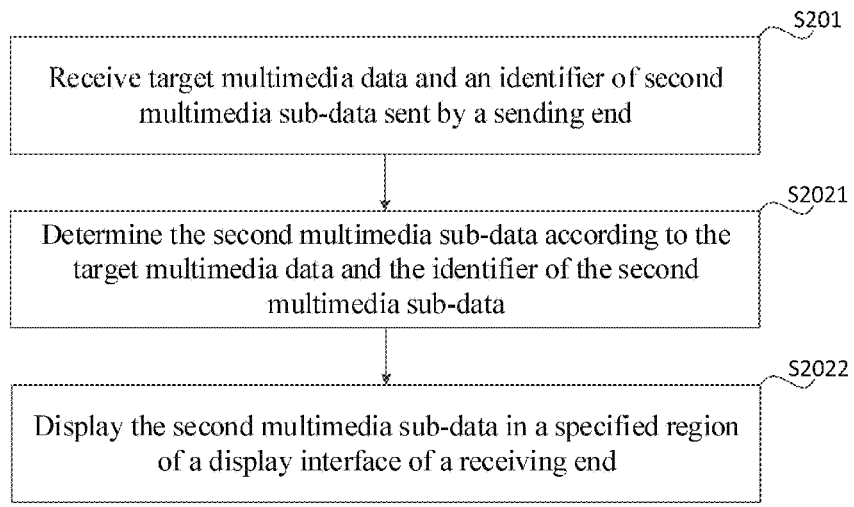
FIG. 9 is a flowchart of another method for processing multimedia data shown according to an example.

FIG. 9 is a flowchart of a method for processing multimedia data shown according to an example. As shown in FIG. 9, an implementation of step S201 may be: the target multimedia data and an identifier of second multimedia sub-data sent by the sending end are received, in which the second multimedia sub-data are obtained by dividing the target multimedia data by the sending end according to the location information, the identifier indicates a location of the second multimedia sub-data in the target multimedia data, and the location information is obtained by obtaining and identifying a transmission instruction by the sending end.

Correspondingly, step of S202 may be implemented through the following steps.

In step S2021, the second multimedia sub-data are determined according to the target multimedia data and the identifier of the second multimedia sub-data.

In step S2022, the second multimedia sub-data are displayed in the specified region of the display interface of the receiving end.

For example, the sending end, after obtaining the target multimedia data, may further obtain a transmission instruction and parse the transmission instruction so as to obtain the location information included in the transmission instruction. The transmission instruction may be, for example, triggered when a user performs operations such as clicking or swiping the multimedia data, and the location information may be configured to indicate a location of the target multimedia data on a display interface. After that, the sending end may divide the target multimedia data into the first multimedia sub-data and the second multimedia sub-data according to the location information, and the first multimedia sub-data are displayed on the display interface of the sending end. In response to determining that the target multimedia data are a picture, the first multimedia sub-data and the second multimedia sub-data may be regarded as two sub-pictures divided from the picture. In response to determining that the target multimedia data are a video, the first multimedia sub-data and the second multimedia sub-data may be regarded as two sub-videos divided from the video, and a video frame included in each sub-video is a part of a video frame included in the video. Furthermore, the sending end may send the target multimedia data and the identifier of the second multimedia sub-data to the receiving end, and the identifier of the second multimedia sub-data is configured to indicate the location of the second multimedia sub-data in the target multimedia data.

The receiving end, after receiving the target multimedia data and the identifier, may extract the second multimedia sub-data from the target multimedia data according to the identifier, and display the second multimedia sub-data in the specified region of the display interface of the receiving end. After that, the target multimedia data may be further saved in a mode of clicking a virtual saving button on a screen, and may be deleted in a mode of up-swiping the picture, clicking a virtual delete button on the screen.

Specifically, taking the transmission instruction being triggered by swiping target multimedia displayed on the display interface of the sending end by the user with a finger as an example, the sending end may detect a location of the finger on the display interface, and divide the first multimedia sub-data and the second multimedia sub-data according to a displacement between a current location of the finger and an initial location of the finger when the finger starts swiping. As shown in FIG. 5, a point a is the initial location of the finger on the display interface, a point b is the current location of the finger on the display interface, the target multimedia data are a picture, according to a location relation between the point a and the point b, the picture may be divided into a Region A and a Region B, a sub-picture composed of pixels in the Region A is the first multimedia sub-data, and a sub-picture composed of pixels in the Region B is the second multimedia sub-data. In other words, the sub-picture corresponding to the Region A is displayed on the sending end, and the sub-picture corresponding to the Region B is displayed on the receiving end.

Figure 10:
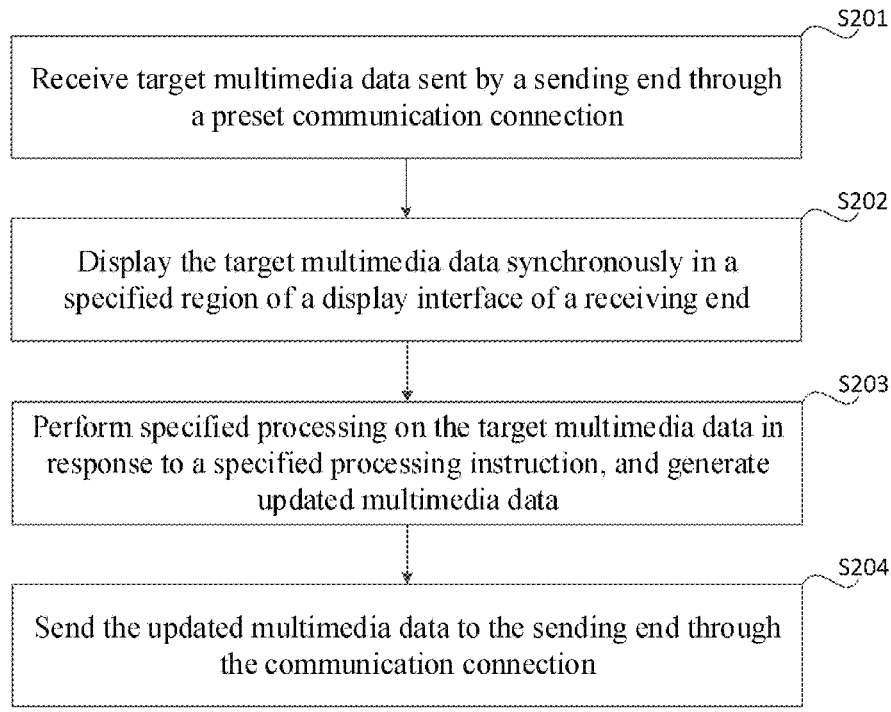
FIG. 10 is a flowchart of another method for processing multimedia data shown according to an example.

FIG. 10 is a flowchart of a method for processing multimedia data shown according to an example. As shown in FIG. 10, the method includes steps S201 and S202 and further includes the following steps.

In step S203, specified processing is performed on the target multimedia data in response to a specified processing instruction, and updated multimedia data are generated.

In step S204, the updated multimedia data are sent to the sending end through the communication connection such that the sending end displays the updated multimedia data, and/or saves the updated multimedia data.

For example, after the receiving end receives the target multimedia data, the user may perform specified processing on the target multimedia data on the receiving end. The specified processing may be regarded as editing the target multimedia data, for example, may be adding a filter, a title, a special effect and other processing, or may also be cutting, compressing and other processing, which is not specifically limited by the disclosure. When the user performs the specified processing on the target multimedia data, the specified processing instruction may be triggered, and the receiving end, after receiving the specified processing instruction, may perform the specified processing on the target multimedia data according to the specified processing instruction and store the processed target multimedia data as the updated multimedia data. After that, the receiving end may send the updated multimedia data to the sending end through the communication connection, and the sending end, after receiving the updated multimedia data, may display the updated multimedia data on the display interface of the sending end, or may also save the updated multimedia data.

Specifically, taking the sending end being a smartphone, the receiving end being a tablet computer, and the target multimedia data being a photo as an example, after the smartphone shoots a photo, if the user intends to edit the photo on the tablet computer, then the photo can be sent to the tablet computer, after the tablet computer receives the photo, the user may edit the photo on the tablet computer, and the edited photo is sent to the smartphone. The smartphone, after receiving the edited photo, may display the edited photo on the display interface or may also save the edited photo.

Figure 11:
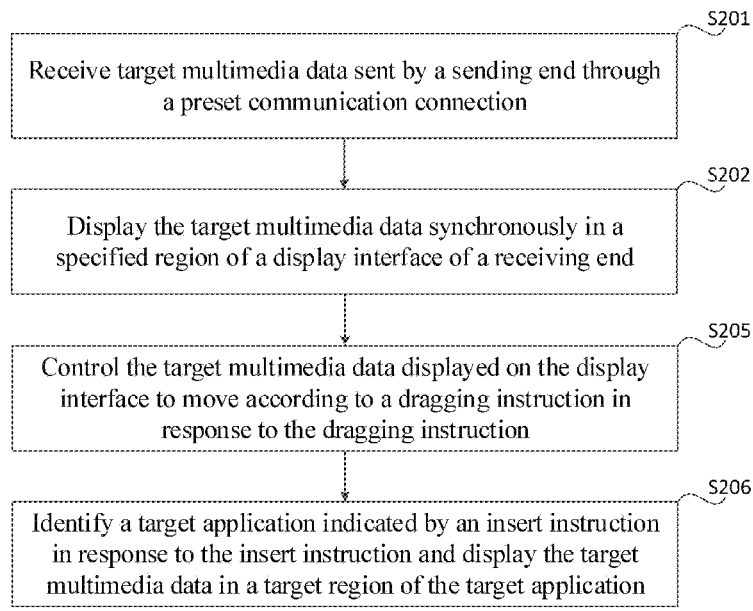
FIG. 11 is a flowchart of another method for processing multimedia data shown according to an example.

FIG. 11 is a flowchart of a method for processing multimedia data shown according to an example. As shown in FIG. 11, the method includes steps S201 and S202 and further includes the following steps.

In step S205, the target multimedia data displayed on the display interface are controlled to move according to a dragging instruction in response to the dragging instruction, and/or in step S206, a target application indicated by an insert instruction is identified in response to the insert instruction, and the target multimedia data are displayed in a target region of the target application.

For example, the receiving end, after receiving the target multimedia data, may save the target multimedia data in the receiving end, and the user may perform corresponding operations on the target multimedia data on the receiving end. For example, the user may drag the target multimedia data to move on the display interface, or may also insert the target multimedia data into the target application. Specifically, when the user drags the target multimedia data on the display interface, the dragging instruction may be triggered, and the receiving end, after the receiving the dragging instruction, may control the target multimedia data to move on the display interface according to the dragging instruction. When the user drags the target multimedia data to a specified region of the target application, or when the user clicks a virtual insert button on the screen, the insert instruction may be triggered, the receiving end may identify the target application indicated by the insert instruction, and the target multimedia data are displayed in the target region of the target application.

Specifically, taking the sending end being the smartphone, the receiving end being a desktop computer, the target multimedia data are a picture, and the target application is Word as an example, in response to determining that the user intends to insert the picture in the smartphone into a Word file on the desktop computer, the smartphone may send the picture to the desktop computer, and the desktop computer, after receiving the picture, may display the picture in the specified region. After that, the user may drag the picture to an editing region of a Word interface through a mouse of the desktop computer, the desktop computer may insert the picture into a location where a cursor is located in the editing region of the Word display interface.

Figure 12:
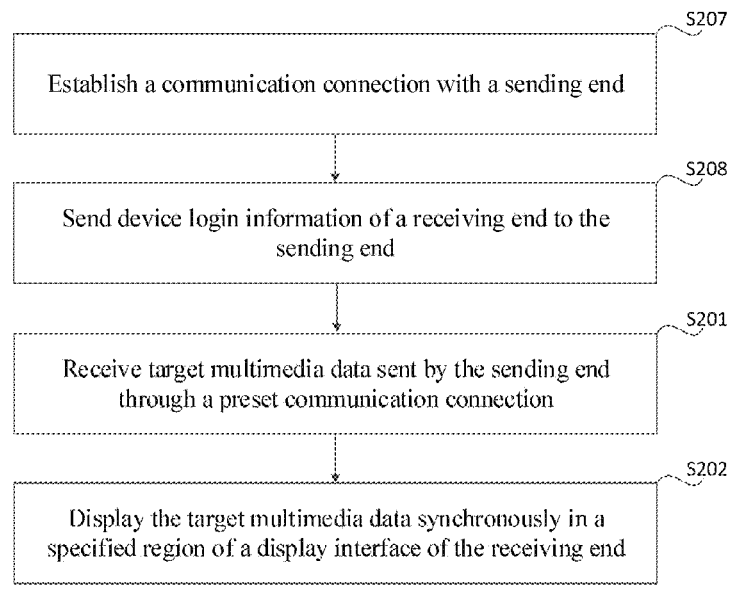
FIG. 12 is a flowchart of another method for processing multimedia data shown according to an example.

FIG. 12 is a flowchart of a method for processing multimedia data shown according to an example. As shown in FIG. 12, the method further includes the following steps.

In step S207, the communication connection with the sending end is established.

In step S208, device login information of the receiving end is sent to the sending end such that the sending end verifies the device login information of the receiving end and determines whether the device login information of the receiving end matches device login information of the sending end.

Steps S207 and S208 are performed prior to steps S201 and S202.

For example, before information interaction is performed between the receiving end and the sending end, the receiving end may firstly establish the communication connection with the sending end through a preset communication protocol. The communication protocol may be a Wi-Fi protocol, a Bluetooth protocol and the like, a Zigbee protocol, a 6LoW-PAN protocol and the like, which is not specifically limited by the disclosure. After the communication connection is established between the receiving end and the sending end, the receiving end may send the device login information of the receiving end to the sending end. The sending end may verify the device login information of the receiving end and judge whether the device login information of the receiving end matches the device login information of the sending end. The condition that the device login information of the receiving end matches the device login information of the sending end may be that the sending end and the receiving end log in the same user account, that the sending end and the receiving end belong to the same local area network, or may also be that there is a social relation (for example, being friends with each other) between a user account which the sending end logs in and a user account which the receiving end logs in, which is not specifically limited by the disclosure. Under the condition that the device login information of the receiving end matches the device login information of the sending end, the receiving end may receive the target multimedia data sent by the sending end through the communication connection. In this way, the communication connection is established between the sending end and the receiving end in advance, transmission of the multimedia data can be performed fast and conveniently, and the data interaction efficiency is improved.

To sum up, in the disclosure, the sending end firstly obtains and displays the target multimedia data in response to the processing instruction and then sends the target multimedia data to the receiving end through the preset communication connection. The receiving end, after receiving the target multimedia data, displays the target multimedia data synchronously in the specified region of the display interface of the receiving end. In the disclosure, the multimedia data are sent to the receiving end through the preset communication connection such that the receiving end can display the target multimedia data synchronously, so the efficiency, the time-efficient performance and the convenience of transmission of the multimedia data are improved.

Figure 13:
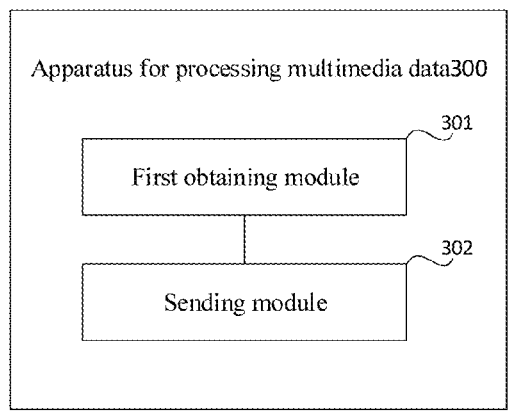
FIG. 13 is a block diagram of an apparatus for processing multimedia data shown according to an example.

FIG. 13 is a block diagram of an apparatus for processing multimedia data shown according to an example. As shown in FIG. 13, the apparatus 300 is applied to a sending end and includes a first obtaining module 301 and a sending module 302.

The first obtaining module 301 is configured to obtain and display target multimedia data in response to a processing instruction; and the sending module 302 is configured to send the target multimedia data to a receiving end through a preset communication connection so as to make the receiving end display the target multimedia data synchronously in a specified region of a display interface of the receiving end.

Figure 14:
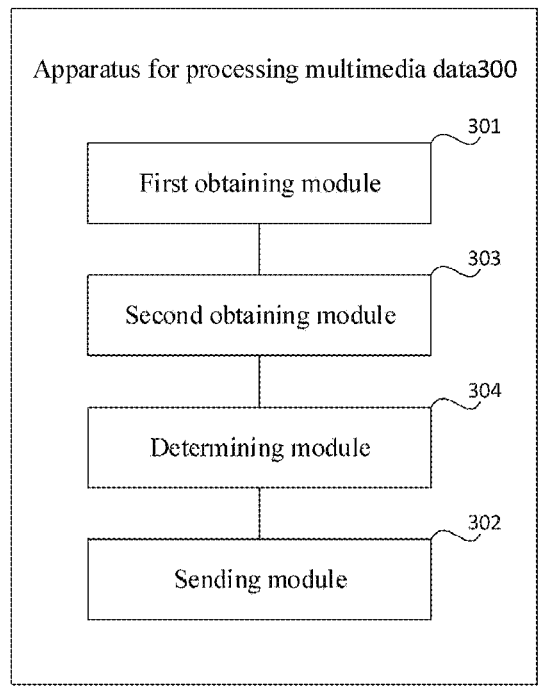
FIG. 14 is a block diagram of another apparatus for processing multimedia data shown according to an example.

FIG. 14 is a block diagram of another apparatus for processing multimedia data shown according to an example. As shown in FIG. 14, there are a plurality of receiving ends, and the apparatus 300 includes the first obtaining module 301 and the sending module 302 and further includes a second obtaining module 303 and a determining module 304.

The second obtaining module 303 is configured to obtain a transmission instruction and identify indication information included in the transmission instruction before sending the target multimedia data to the receiving end through the preset communication connection.

The determining module 304 is configured to determine a target receiving end corresponding to the indication information among the plurality of receiving ends.

The sending module 302 is configured to: send the target multimedia data to the target receiving end through the communication connection.

In an application scenario, the indication information includes: gesture direction information. The determining module 304 is configured to: determine a location relation between each of the receiving ends and the sending end; and use a receiving end which the location relation with the sending end matching the gesture direction information as the target receiving end.

Figure 15:
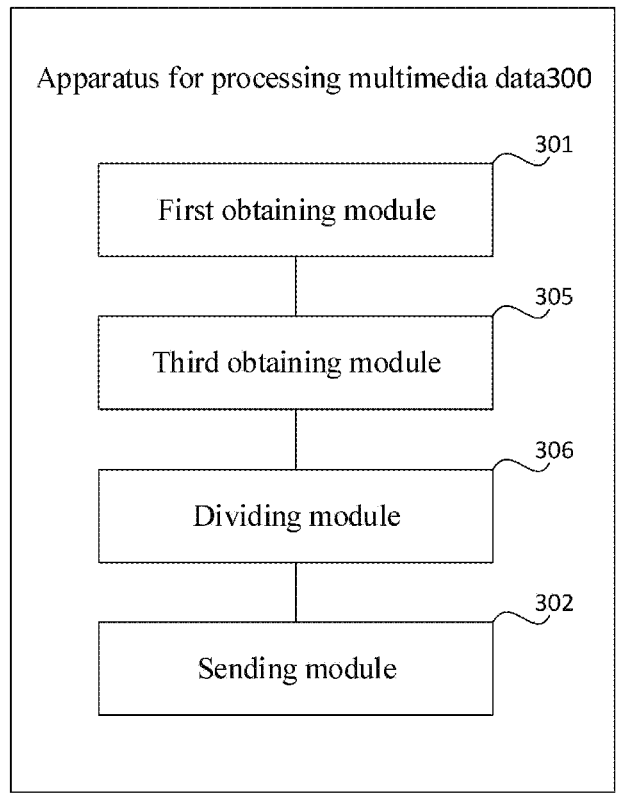
FIG. 15 is a block diagram of another apparatus for processing multimedia data shown according to an example.

FIG. 15 is a block diagram of another apparatus for processing multimedia data shown according to an example. As shown in FIG. 15, the apparatus 300 includes the first obtaining module 301 and the sending module 302 and further includes a third obtaining module 305 and a dividing module 306.

The third obtaining module 305 is configured to obtain a transmission instruction and identify location information included in the transmission instruction before sending the target multimedia data to the receiving end through the preset communication connection.

The dividing module 306 is configured to divide the target multimedia data into first multimedia sub-data and second multimedia sub-data according to the location information, and display the first multimedia sub-data on a display interface of the sending end.

The sending module 302 is configured to: send the target multimedia data and an identifier of the second multimedia sub-data to the receiving end so as to make the receiving end display the second multimedia sub-data in the specified region of the display interface of the receiving end, in which the identifier is configured to indicate a location of the second multimedia sub-data in the target multimedia data.

Figure 16:
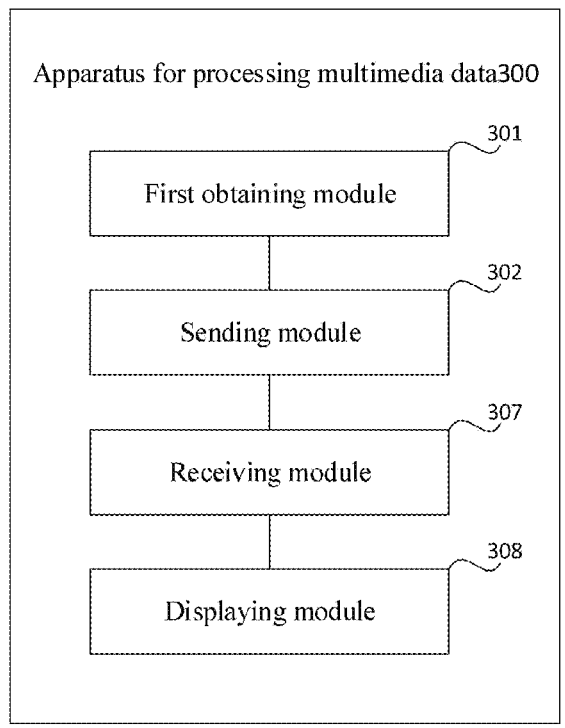
FIG. 16 is a block diagram of another apparatus for processing multimedia data shown according to an example.

FIG. 16 is a block diagram of another apparatus for processing multimedia data shown according to an example. As shown in FIG. 16, the apparatus 300 includes the first obtaining module 301 and the sending module 302 and further includes a receiving module 307 and a displaying module 308.

The receiving module 307 is configured to receive updated multimedia data sent by the receiving end, in which the updated multimedia data are generated after the receiving end performs specified processing on the target multimedia data.

The displaying module 308 is configured to display the updated multimedia data, and/or save the updated multimedia data.

Figure 17:
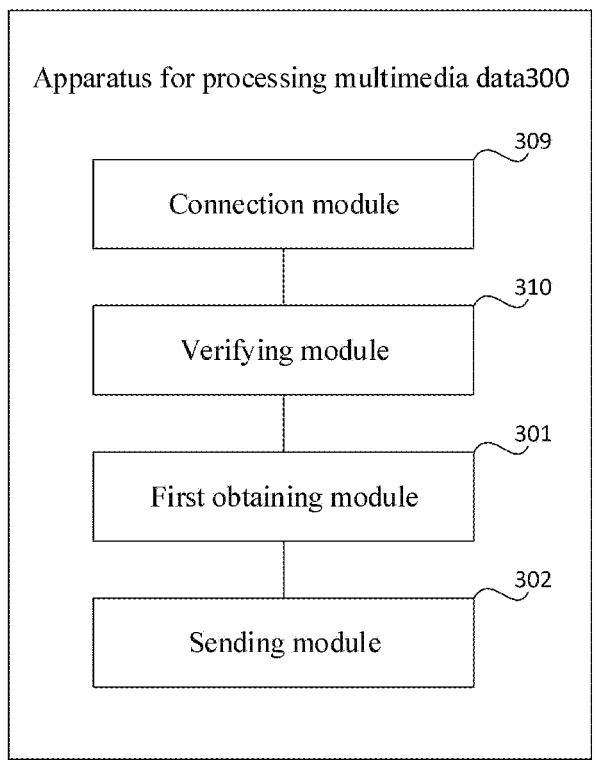
FIG. 17 is a block diagram of another apparatus for processing multimedia data shown according to an example.

FIG. 17 is a block diagram of another apparatus for processing multimedia data shown according to an example. As shown in FIG. 17, the apparatus 300 includes the first obtaining module 301 and the sending module 302 and further includes a connection module 309 and a verifying module 310.

The connection module 309 is configured to establish the communication connection with the receiving end.

The verifying module 310 is configured to verify device login information of the receiving end so as to determine whether the device login information of the receiving end matches device login information of the sending end.

The sending module 302 is configured to: send the target multimedia data to the receiving end through the communication connection under the condition that the device login information of the receiving end matches the device login information of the sending end.

As for the apparatus in the above example, specific modes of executing operations by the various modules are already described in detail in the example of the related method, so detailed description will not be made here.

To sum up, in the disclosure, the sending end firstly obtains and displays the target multimedia data in response to the processing instruction and then sends the target multimedia data to the receiving end through the preset communication connection. The receiving end, after receiving the target multimedia data, displays the target multimedia data synchronously in the specified region of the display interface of the receiving end. In the disclosure, the multimedia data are sent to the receiving end through the preset communication connection such that the receiving end can display the target multimedia data synchronously, so an efficiency, time-efficient performance and convenience of transmission of the multimedia data are improved.

Figure 18:
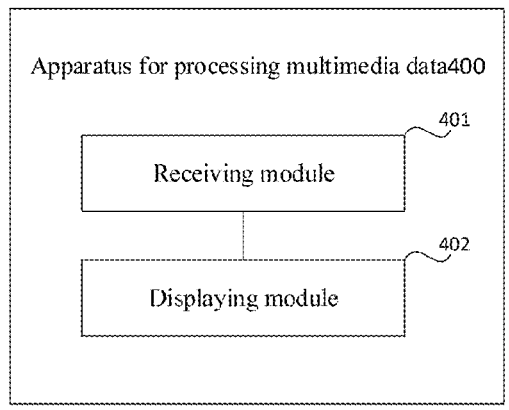
FIG. 18 is a block diagram of an apparatus for processing multimedia data shown according to an example.

FIG. 18 is a block diagram of an apparatus for processing multimedia data shown according to an example. As shown in FIG. 18, the apparatus 400 is applied to a receiving end and includes a receiving module 401 and a displaying module 402.

The receiving module 401 is configured to receive target multimedia data sent by a sending end through a preset communication connection, in which the target multimedia data are obtained and displayed by the sending end in response to a processing instruction.

The displaying module 402 is configured to display the target multimedia data synchronously in a specified region of a display interface of the receiving end.

In an application scenario, the receiving module 401 is configured to: receive the target multimedia data and an identifier of second multimedia sub-data sent by the sending end, in which the second multimedia sub-data are obtained by dividing the target multimedia data by the sending end according to the location information, the identifier indicates a location of the second multimedia sub-data in the target multimedia data, and the location information is obtained by obtaining and identifying a transmission instruction by the sending end.

The displaying module 402 is configured to: determine the second multimedia sub-data according to the target multimedia data and the identifier of the second multimedia sub-data; and display the second multimedia sub-data in the specified region of the display interface of the receiving end.

Figure 19:
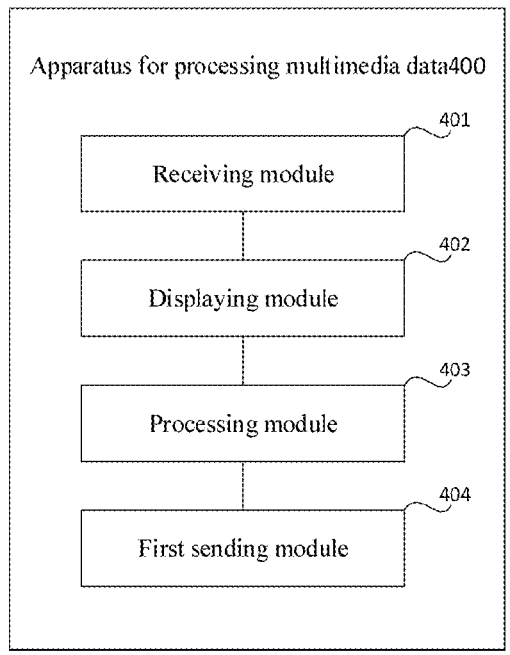
FIG. 19 is a block diagram of another apparatus for processing multimedia data shown according to an example.

FIG. 19 is a block diagram of another apparatus for processing multimedia data shown according to an example. As shown in FIG. 19, the apparatus 400 includes the receiving module 401 and the displaying module 402 and further includes a processing module 403 and a first sending module 404.

The processing module 403 is configured to perform specified processing on the target multimedia data in response to a specified processing instruction and generate updated multimedia data.

The first sending module 404 is configured to send the updated multimedia data to the sending end through the communication connection so as to make the sending end display the updated multimedia data, and/or save the updated multimedia data.

Figure 20:
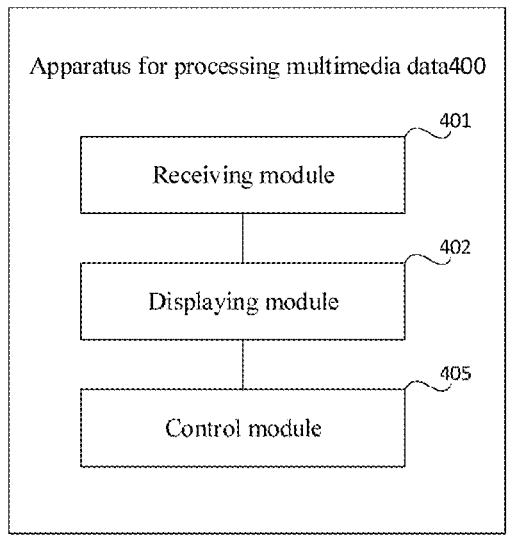
FIG. 20 is a block diagram of another apparatus for processing multimedia data shown according to an example.

FIG. 20 is a block diagram of another apparatus for processing multimedia data shown according to an example. As shown in FIG. 20, the apparatus 400 includes the receiving module 401 and the displaying module 402 and further includes a control module 405, configured to: control the target multimedia data displayed on the display interface to move according to a dragging instruction in response to the dragging instruction; and/or identify a target application indicated by an insert instruction in response to the insert instruction, and display the target multimedia data in a target region of the target application.

Figure 21:
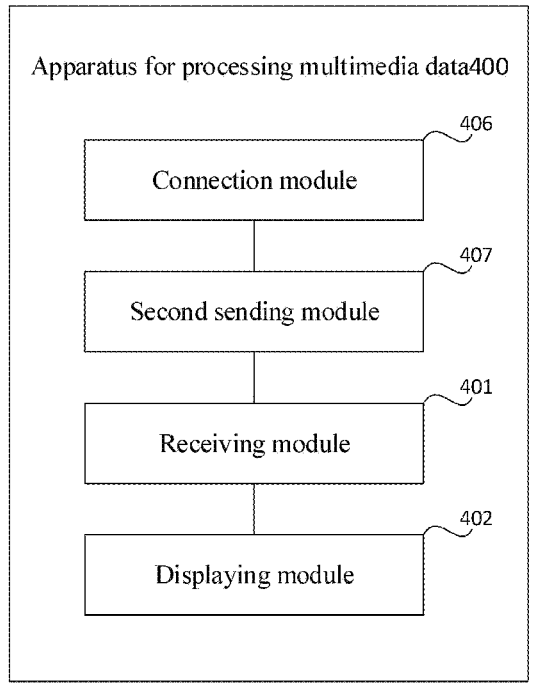
FIG. 21 is a block diagram of another apparatus for processing multimedia data shown according to an example.

FIG. 21 is a block diagram of another apparatus for processing multimedia data shown according to an example. As shown in FIG. 21, the apparatus 400 includes the receiving module 401 and the displaying module 402 and further includes a connection module 406 and a second sending module 407.

The connection module 406 is configured to establish the communication connection with the sending end.

The second sending module 407 is configured to send device login information of the receiving end to the sending end so as to make the sending end verify the device login information of the receiving end and determine whether the device login information of the receiving end matches device login information of the sending end.

As for the apparatus in the above example, specific modes of executing operations by the various modules are already described in detail in the example of the related method, so detailed description will not be made here.

To sum up, in the disclosure, the sending end firstly obtains and displays the target multimedia data in response to the processing instruction and then sends the target multimedia data to the receiving end through the preset communication connection. The receiving end, after receiving the target multimedia data, displays the target multimedia data synchronously in the specified region of the display interface of the receiving end. In the disclosure, the multimedia data are sent to the receiving end through the preset communication connection such that the receiving end can display the target multimedia data synchronously, so an efficiency, time-efficient performance and convenience of transmission of the multimedia data are improved.

The disclosure further provides a computer-readable storage medium, storing a computer program instruction. The program instruction, when executed by a processor, implements steps of a method for processing multimedia data provided by the disclosure.

Figure 22:
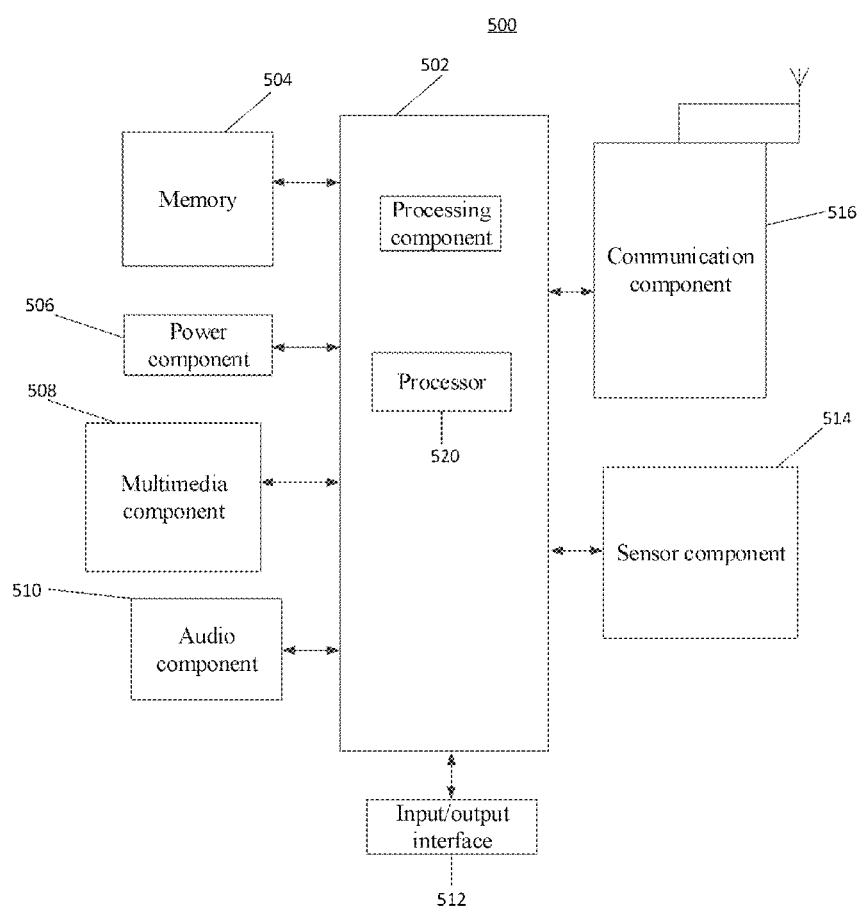
FIG. 22 is a block diagram of an apparatus for processing multimedia data shown according to an example.

FIG. 22 is a block diagram of an apparatus 500 for processing multimedia data shown according to an example. For example, the apparatus 500 may be a mobile phone, a computer, a digital broadcast terminal, a messaging device, a game console, a tablet device, a medical device, a fitness facility, a personal digital assistant and the like.

Referring to FIG. 22, the apparatus 500 may include one or more components as follows: a processing component 502, a memory 504, a power component 506, a multimedia component 508, an audio component 510, an input/output (I/O) interface 512, a sensor component 514 and a communication component 516.

The processing component 502 generally controls whole operation of the apparatus 500, such as operations related to display, phone call, data communication, camera operation and recording operation. The processing component 502 may include one or more processors 520 for executing the instructions so as to complete all or part of steps of a method for processing multimedia data. Besides, the processing component 502 may include one or more modules to facilitate interaction between the processing component 502 and the other components. For example, the processing component 502 may include a multimedia module so as to facilitate interaction between the multimedia component 508 and the processing component 502.

The memory 504 is configured to store various data so as to support operations on the apparatus 500. Examples of these data include instructions of any application program or method for operation on the apparatus 500, contact person data, telephone directory data, messages, pictures, videos and the like. The memory 504 may be realized by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disc.

The power component 506 provides power for the various components of the apparatus 500. The power component 506 may include a power management system, one or more power sources, and other components related to power generation, management and distribution for the apparatus 500.

The multimedia component 508 includes a screen which provides an output interface between the apparatus 500 and a user. In some examples, the screen may include a liquid crystal display (LCD) and a touch panel (TP). If the screen includes the touch panel, the screen may be realized as a touch screen so as to receive an input signal from the user. The touch panel includes one or more touch sensors so as to sense touching, swiping and gestures on the touch panel. The touch sensor can not only sense a boundary of a touching or swiping action, but also detect duration and pressure related to touching or swiping operation. In some examples, the multimedia component 508 includes a front camera and/or a back camera. When the apparatus 500 is in an operation mode, such as a photographing mode or a video mode, the front camera and/or the back camera can receive external multimedia data. Each front camera and each back camera may be a fixed optical lens system or have a focal length and an optical zoom capability.

The audio component 510 is configured to output and/or input an audio signal. For example, the audio component 510 includes a microphone (MIC). When the apparatus 500 is in the operation mode, such as a call mode, a recording mode and a voice recognition mode, the microphone is configured to receive an external audio signal. The received audio signal may be further stored in the memory 504 or sent via the communication component 516. In some examples, the audio component 510 further includes a speaker for outputting the audio signal.

The I/O interface 512 provides an interface between the processing component 502 and a peripheral interface module, and the above peripheral interface module may be a keyboard, a click wheel, buttons and the like. These buttons may include but not limited to: a home button, a volume button, a start button and a lock button.

The sensor component 514 includes one or more sensors, configured to provide state evaluation of various aspects for the apparatus 500. For example, the sensor component 514 may detect a start/shut-down state of the apparatus 500 and relative positioning of the components, and for example, the components are a display and a keypad of the apparatus 500. The sensor component 514 may further detect position change of the apparatus 500 or one component of the apparatus 500, whether there is contact between the user and the apparatus 500, and azimuth or speed up/speed down and temperature change of the apparatus 500. The sensor component 514 may include a proximity sensor, configured to detect existence of a nearby object without any physical contact. The sensor component 514 may further include an optical sensor, such as a CMOS or CCD image sensor, for use in imaging application. In some examples, the sensor component 514 may further include an acceleration sensor, a gyroscope sensor, a magnetic sensor, a pressure sensor or a temperature sensor.

The communication component 516 is configured to facilitate wired or wireless communication between the apparatus 500 and the other devices. The apparatus 500 may be accessed to a wireless network based on a communication standard, such as WiFi, 2G or 3G, or their combination. In an example, the communication component 516 receives a broadcast signal or related broadcast information from an external broadcast management system via a broadcast channel. In an example, the communication component 516 further includes a near-field communication (NFC) module so as to facilitate short-range communication. For example, the NFC module may be realized based on a radio frequency identification (RFID) technology, an infra-red data association (IrDA) technology, an ultra wide band (UWB) technology, a Bluetooth (BT) technology and other technologies.

In an example, the apparatus 500 may be realized by one or more application specific integrated circuits (ASICs), digital signal processors (DSPs), digital signal processing devices (DSPDs), programmable logic devices (PLDs), field-programmable gate arrays (FPGAs), controllers, microcontrollers, microprocessors or other electronic elements for executing the above method for processing the multimedia data.

In an example, a non-transitory computer readable storage medium including instructions is further provided, such as a memory 504 including the instructions. The instructions may be executed by the processor 520 of the apparatus 500 so as to complete the above method for processing the multimedia data. For example, the non-transitory computer readable storage medium may be an ROM, a random access memory (RAM), a CD-ROM, a magnetic tape, a floppy disk, an optical data storage device and the like.

In another example, a computer program product is further provided. The computer program product contains a computer program capable of being executed by a programmable apparatus. The computer program has a code part which is used for executing the above method for processing the multimedia data when the computer program is executed by the programmable apparatus.

Those skilled in the art will easily figure out other implementation solutions of the disclosure after considering the specification and practicing the disclosure. The disclosure intends to cover any transformation, purpose or adaptive change of the disclosure which conforms to a general principle of the disclosure and includes common general knowledge or conventional technical means which are not disclosed by the disclosure in the technical field. The specification and the examples are merely regarded as examples, the true scope and spirit of the disclosure are indicated by the following claims.

It should be understood that the disclosure is not limited to an accurate structure described above and shown in the accompanying drawings and accepts various modifications and changes without departing from its scope. The scope of the disclosure is limited merely by the appended claims.

According to a first aspect of examples of the disclosure, a method for processing multimedia data is provided and performed by a sending end, and includes: obtaining and displaying target multimedia data in response to a processing instruction; and sending the target multimedia data to a receiving end through a preset communication connection so as to make the receiving end display the target multimedia data synchronously in a specified region of a display interface of the receiving end.

In some examples, there are a plurality of receiving ends, before sending the target multimedia data to the receiving end through the preset communication connection, the method further includes: obtaining a transmission instruction and identifying indication information included in the transmission instruction; and determining a target receiving end corresponding to the indication information among the plurality of receiving ends. Sending the target multimedia data to the receiving end through the preset communication connection includes sending the target multimedia data to the target receiving end through the communication connection.

In some examples, the indication information includes: gesture direction information; and determining the target receiving end corresponding to the indication information among the plurality of receiving ends includes: determining a location relation between each of the receiving ends and the sending end; and using a receiving end which the location relation with the sending end matching the gesture direction information as the target receiving end.

In some examples, before sending the target multimedia data to the receiving end through the preset communication connection, the method further includes: obtaining a transmission instruction and identifying location information included in the transmission instruction; and dividing the target multimedia data into first multimedia sub-data and second multimedia sub-data according to the location information, and displaying the first multimedia sub-data on a display interface of the sending end Sending the target multimedia data to the receiving end through the preset communication connection includes: sending the target multimedia data and an identifier of the second multimedia sub-data to the receiving end so as to make the receiving end display the second multimedia sub-data in the specified region of the display interface of the receiving end, in which the identifier is configured to indicate a location of the second multimedia sub-data in the target multimedia data.

In some examples, the method further includes: receiving updated multimedia data sent by the receiving end, in which the updated multimedia data are generated after the receiving end performs specified processing on the target multimedia data; and displaying the updated multimedia data, and/or saving the updated multimedia data.

In some examples, the method further includes: establishing the communication connection with the receiving end; and verifying device login information of the receiving end so as to determine whether the device login information of the receiving end matches device login information of the sending end. Sending the target multimedia data to the receiving end through the preset communication connection includes: sending the target multimedia data to the receiving end through the communication connection under the condition that the device login information of the receiving end matches the device login information of the sending end.

According to a second aspect of examples of the disclosure, a method for processing multimedia data is provided and performed by a receiving end, and includes: receiving target multimedia data sent by a sending end through a preset communication connection, in which the target multimedia data are obtained and displayed by the sending end in response to a processing instruction; and displaying the target multimedia data synchronously in a specified region of a display interface of the receiving end.

In some examples, receiving the target multimedia data sent by the sending end through the preset communication connection includes: receiving the target multimedia data and an identifier of second multimedia sub-data sent by the sending end, in which the second multimedia sub-data are obtained by dividing the target multimedia data by the sending end according to the location information, the identifier indicates a location of the second multimedia sub-data in the target multimedia data, and the location information is obtained by obtaining and identifying a transmission instruction by the sending end. Displaying the target multimedia data synchronously in the specified region of the display interface of the receiving end includes: determining the second multimedia sub-data according to the target multimedia data and the identifier of the second multimedia sub-data; and displaying the second multimedia sub-data in the specified region of the display interface of the receiving end.

In some examples, the method further includes: performing specified processing on the target multimedia data in response to a specified processing instruction and generating updated multimedia data; and sending the updated multimedia data to the sending end through the communication connection so as to make the sending end display the updated multimedia data, and/or save the updated multimedia data.

In some examples, the method further includes: controlling the target multimedia data displayed on the display interface to move according to a dragging instruction in response to the dragging instruction; and/or identifying a target application indicated by an insert instruction in response to the insert instruction, and displaying the target multimedia data in a target region of the target application.

In some examples, the method further includes: establishing the communication connection with the sending end; and sending device login information of the receiving end to the sending end so as to make the sending end verify the device login information of the receiving end and determine whether the device login information of the receiving end matches device login information of the sending end.

According to a third aspect of examples of the disclosure, an apparatus for processing multimedia data is provided and performed by a sending end, and includes: a first obtaining module, configured to obtain and display target multimedia data in response to a processing instruction; and a sending module, configured to send the target multimedia data to a receiving end through a preset communication connection so as to make the receiving end display the target multimedia data synchronously in a specified region of a display interface of the receiving end.

In some examples, there are a plurality of receiving ends, and the apparatus further includes: a second obtaining module, configured to obtain a transmission instruction and identify indication information included in the transmission instruction before sending the target multimedia data to the receiving end through the preset communication connection; and a determining module, configured to determine a target receiving end corresponding to the indication information among the plurality of receiving ends. The sending module is configured to: send the target multimedia data to the target receiving end through the communication connection.

In some examples, the indication information includes: gesture direction information; and the determining module is configured to: determine a location relation between each of the receiving ends and the sending end; and use a receiving end which the location relation with the sending end matching the gesture direction information as the target receiving end.

In some examples, the apparatus further includes: a third obtaining module, configured to obtain a transmission instruction and identify location information included in the transmission instruction before sending the target multimedia data to the receiving end through the preset communication connection; and a dividing module, configured to divide the target multimedia data into first multimedia sub-data and second multimedia sub-data according to the location information, and display the first multimedia sub-data on a display interface of the sending end. The sending module is configured to: send the target multimedia data and an identifier of the second multimedia sub-data to the receiving end so as to make the receiving end display the second multimedia sub-data in the specified region of the display interface of the receiving end, in which the identifier is configured to indicate a location of the second multimedia sub-data in the target multimedia data.

In some examples, the apparatus further includes: a receiving module, configured to receive updated multimedia data sent by the receiving end, in which the updated multimedia data are generated after the receiving end performs specified processing on the target multimedia data; and a displaying module, configured to display the updated multimedia data, and/or save the updated multimedia data.

In some examples, the apparatus further includes: a connection module, configured to establish the communication connection with the receiving end; and a verifying module, configured to verify device login information of the receiving end so as to determine whether the device login information of the receiving end matches device login information of the sending end. The sending module is configured to: send the target multimedia data to the receiving end through the communication connection under the condition that the device login information of the receiving end matches the device login information of the sending end.

According to a fourth aspect of examples of the disclosure, an apparatus for processing multimedia data is provided and performed by a receiving end, and includes: a receiving module, configured to receive target multimedia data sent by a sending end through a preset communication connection, in which the target multimedia data are obtained and displayed by the sending end in response to a processing instruction; and a displaying module, configured to display the target multimedia data synchronously in a specified region of a display interface of the receiving end.

In some examples, the receiving module is configured to: receive the target multimedia data and an identifier of second multimedia sub-data sent by the sending end, in which the second multimedia sub-data are obtained by dividing the target multimedia data by the sending end according to the location information, the identifier indicates a location of the second multimedia sub-data in the target multimedia data, and the location information is obtained by obtaining and identifying a transmission instruction by the sending end. The displaying module is configured to: determine the second multimedia sub-data according to the target multimedia data and the identifier of the second multimedia sub-data; and display the second multimedia sub-data in the specified region of the display interface of the receiving end.

In some examples, the apparatus further includes: a processing module, configured to perform specified processing on the target multimedia data in response to a specified processing instruction and generate updated multimedia data; and a first sending module, configured to send the updated multimedia data to the sending end through the communication connection so as to make the sending end display the updated multimedia data, and/or save the updated multimedia data.

In some examples, the apparatus further includes a control module, configured to: control the target multimedia data displayed on the display interface to move according to a dragging instruction in response to the dragging instruction; and/or identify a target application indicated by an insert instruction in response to the insert instruction, and display the target multimedia data in a target region of the target application.

In some examples, the apparatus further includes: a connection module, configured to establish the communication connection with the sending end; and a second sending module, configured to send device login information of the receiving end to the sending end so as to make the sending end verify the device login information of the receiving end and determine whether the device login information of the receiving end matches device login information of the sending end.

The technical solutions provided by the examples of the disclosure may include the following beneficial effects.

The sending end firstly obtains and displays the target multimedia data in response to the processing instruction and then sends the target multimedia data to the receiving end through the preset communication connection. The receiving end, after receiving the target multimedia data, displays the target multimedia data synchronously in the specified region of the display interface of the receiving end. In the disclosure, the multimedia data are sent to the receiving end through the preset communication connection such that the receiving end can display the target multimedia data synchronously, so an efficiency, time-efficient performance and convenience of transmission of the multimedia data are improved.

What is claimed is:

1. A method for processing multimedia data, performed by a sending end and comprising:
    obtaining and displaying target multimedia data on a display interface of the sending end in response to a processing instruction;
    sending the target multimedia data to a receiving end through a preset communication connection so as to make the receiving end display the target multimedia data synchronously in a specified region of a display interface of the receiving end;
    wherein before sending the target multimedia data to the receiving end through the preset communication connection, the method further comprises:
    obtaining a transmission instruction and identifying location information in the transmission instruction based on a displacement between a current location of a finger on the sending end display interface and an initial location of the finger from which a swiping operation on the sending end display interface began, wherein the transmission instruction is triggered when the swiping operation is performed, the location information is configured to indicate a location of the target multimedia data with respect to the sending end display interface; and
    determining a sub-image located on the sending end display interface as a first multimedia sub-data and determining a sub-image that exceeds the sending end display interface is within a preset size in the direction of the swiping operation as a second multimedia sub-data according to the location information, and displaying the first multimedia sub-data on the display interface of the sending end,
    wherein the sending the target multimedia data to the receiving end through the preset communication connection comprises:
    sending the target multimedia data and an identifier of the second multimedia sub-data to the receiving end so as to make the receiving end display the second multimedia sub-data in the specified region of the display interface of the receiving end, wherein the identifier is configured to indicate a location of the second multimedia sub-data in the target multimedia data.

2. The method according to claim 1, wherein there are a plurality of receiving ends, before sending the target multimedia data to the receiving end through the preset communication connection, the method further comprises:

obtaining a transmission instruction and identifying indication information comprised in the transmission instruction; and determining a target receiving end corresponding to the indication information among the plurality of receiving ends, wherein the sending the target multimedia data to the receiving end through the preset communication connection comprises:

sending the target multimedia data to the target receiving end through the communication connection.

3. The method according to claim 2, wherein the indication information comprises: gesture direction information; and determining the target receiving end corresponding to the indication information among the plurality of receiving ends comprises:

determining a location relation between each of the receiving ends and the sending end; and using a receiving end which the location relation with the sending end matching the gesture direction information as the target receiving end.

4. The method according to claim 1, further comprising:

receiving updated multimedia data sent by the receiving end, wherein the updated multimedia data are generated after the receiving end performs specified processing on the target multimedia data; and at least one of displaying the updated multimedia data, and saving the updated multimedia data.

5. The method according to claim 1, further comprising:

establishing the communication connection with the receiving end; and verifying device login information of the receiving end so as to determine whether the device login information of the receiving end matches device login information of the sending end, wherein the sending the target multimedia data to the receiving end through the preset communication connection comprises:

sending the target multimedia data to the receiving end through the communication connection under the condition that the device login information of the receiving end matches the device login information of the sending end.

6. A method for processing multimedia data, performed by a receiving end and comprising:

receiving target multimedia data sent by a sending end through a preset communication connection, wherein the target multimedia data are obtained and displayed by the sending end on a display interface of the sending end in response to a processing instruction; and displaying the target multimedia data synchronously in a specified region of a display interface of the receiving end;

wherein receiving the target multimedia data sent by the sending end through the preset communication connection comprises:

receiving the target multimedia data and an identifier of second multimedia sub-data sent by the sending end, wherein the sending end obtains a transmission instruction and identifies location information in the transmission instruction based on a displacement between a current location of a finger on the display interface and an initial location of the finger from which a swiping operation on the sending end display interface began, the transmission instruction is triggered when the swiping operation is performed, the location information is configured to indicate a location of the target multimedia data on the sending end display interface, the sending end determines a sub-image that exceeds the sending end display interface and is within a preset size in the direction of the swiping operation as a second multimedia sub-data, according to the location information, the identifier indicates a location of the second multimedia sub-data in the target multimedia data, wherein the displaying the target multimedia data synchronously in the specified region of the display interface of the receiving end comprises:

determining the second multimedia sub-data according to the target multimedia data and the identifier of the second multimedia sub-data, and displaying the second multimedia sub-data in the specified region of the display interface of the receiving end.

7. The method according to claim 6, further comprising:

performing specified processing on the target multimedia data in response to a specified processing instruction and generating updated multimedia data; and sending the updated multimedia data to the sending end through the communication connection so as to make the sending end display the updated multimedia data, and/or save the updated multimedia data.

8. The method according to claim 6, further comprising:

controlling the target multimedia data displayed on the display interface of the receiving end to move according to a dragging instruction in response to the dragging instruction.

9. The method according to claim 6, further comprising:

identifying a target application indicated by an insert instruction in response to the insert instruction, and displaying the target multimedia data in a target region of the target application.

10. The method according to claim 6, further comprising:

establishing the communication connection with the sending end; and sending device login information of the receiving end to the sending end so as to make the sending end verify the device login information of the receiving end and determine whether the device login information of the receiving end matches device login information of the sending end.

11. An apparatus for processing multimedia data, applied to a sending end and comprising:

a processor; and a memory, configured to store instructions capable of being executed by the processor, wherein the processor is configured to:

obtain and display target multimedia data on a display interface of the sending end in response to a processing instruction, and send the target multimedia data to a receiving end through a preset communication connection so as to make the receiving end display the target multimedia data synchronously in a specified region of a display interface of the receiving end;

wherein the processor is further configured to:

obtain a transmission instruction and identify location information in the transmission instruction based on a displacement between the current location of a finger on the sending end display interface and an initial location of the finger from which a swiping operation on the sending end display interface began, wherein the transmission instruction is triggered when the swiping operation is performed, the location information is configured to indicate a location of the target multimedia data with respect to the sending end display interface;

determine a sub-image located on the sending end display interface as a target multimedia data and determine a sub-image that exceeds the sending end display interface and is within a preset size in the direction of the swiping operation as a second multimedia sub-data according to the location information, and displaying the first multimedia sub-data on a display interface of the sending end; and send the target multimedia data and an identifier of the second multimedia sub-data to the receiving end so as to make the receiving end display the second multimedia sub-data in the specified region of the display interface of the receiving end, wherein the identifier is configured to indicate a location of the second multimedia sub-data in the target multimedia data.

12. The apparatus according to claim 11, wherein there are a plurality of receiving ends, the processor is further configured to:

obtain a transmission instruction and identifying indication information comprised in the transmission instruction; and determine a target receiving end corresponding to the indication information among the plurality of receiving ends, wherein sending the target multimedia data to the receiving end through the preset communication connection comprises:

sending the target multimedia data to the target receiving end through the communication connection.

13. The apparatus according to claim 12, wherein the indication information comprises:

gesture direction information;

the processor is further configured to:

determine a location relation between each of the receiving ends and the sending end; and use a receiving end which the location relation with the sending end matching the gesture direction information as the target receiving end.

14. The apparatus according to claim 11, the processor is further configured to:

receive updated multimedia data sent by the receiving end, wherein the updated multimedia data are generated after the receiving end performs specified processing on the target multimedia data; and display the updated multimedia data, and/or saving the updated multimedia data.

15. An apparatus for processing multimedia data, applied to a receiving end and comprising:

a processor; and a memory, configured to store instructions capable of being executed by the processor, wherein the processor is configured to implement the steps of the method according to claim 6.

16. A non-transitory computer-readable storage medium, storing computer program instructions, wherein the program instructions, when executed by a processor, implements steps of the method according to claim 1.

17. A non-transitory computer-readable storage medium, storing computer program instructions, wherein the program instruction, when executed by a processor, implements steps of the method according to claim 6.

* * * * *

UNITED STATES PATENT AND TRADEMARK OFFICE
CERTIFICATE OF CORRECTION

| | |
|---|---|
| PATENT NO. | : 12,147,727 B2 |
| APPLICATION NO. | : 17/957572 |
| DATED | : November 19, 2024 |
| INVENTOR(S) | : Linger Zhao |

Page 1 of 1

It is certified that error appears in the above-identified patent and that said Letters Patent is hereby corrected as shown below:

In the Specification

In Column 1, Line 9, delete "202111275459.5," and insert -- 202111275495.5, --, therefor.

In Column 17, Line 36, delete "not" and insert -- are not --, therefor.

In Column 18, Line 3, delete "ultra wide band" and insert -- ultra-wideband --, therefor.

Signed and Sealed this
Twenty-first Day of January, 2025

Coke Morgan Stewart
*Acting Director of the United States Patent and Trademark Office*